(12) United States Patent
Lopota et al.

(10) Patent No.: US 8,189,049 B2
(45) Date of Patent: May 29, 2012

(54) INTRUSION ALARM VIDEO-PROCESSING DEVICE

(75) Inventors: Vitaly Alexandrovich Lopota, Saint-Petersbrug (RU); Alexander Sergeyevich Kondratyev, Saint-Petersbrug (RU); Victor Ivanovich Yudin, Saint-Petersbrug (RU); Sergey Anatoliyevich Polovko, Saint-Petersbrug (RU); Ekaterina Yurevna Smirnova, Saint-Petersbrug (RU); Kirill Nikolayevich Stupin, Saint-Petersbrug (RU); Lev Borisovich Kogan, Saint-Petersbrug (RU); Dmitry Nikolayevich Stepanov, Syas'sstroy (RU); Wataru Ito, Nishi-tokyo (JP); Mitsue Ito, Koganei (JP); Kazunari Iwanaga, Kodaira (JP); Miyuki Fujii, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 340 days.

(21) Appl. No.: 12/690,667

(22) Filed: Jan. 20, 2010

(65) Prior Publication Data

US 2010/0201820 A1    Aug. 12, 2010

(30) Foreign Application Priority Data

Jan. 22, 2009   (RU) .................................. 2009102124

(51) Int. Cl.
*H04N 7/18* (2006.01)
*G06K 9/34* (2006.01)
(52) U.S. Cl. ................. 348/152; 348/E07.085; 382/171
(58) Field of Classification Search ................... 382/171
See application file for complete search history.

(56) References Cited

U.S. PATENT DOCUMENTS

| 6,125,142 | A | * | 9/2000 | Han | 375/240.1 |
| 6,141,459 | A | | 10/2000 | Gendel | |
| 6,833,845 | B2 | * | 12/2004 | Kitagawa et al. | 345/667 |
| 8,094,936 | B2 | * | 1/2012 | Woo et al. | 382/173 |
| 2002/0051007 | A1 | * | 5/2002 | Kitagawa et al. | 345/660 |
| 2002/0051058 | A1 | * | 5/2002 | Ito et al. | 348/152 |

(Continued)

FOREIGN PATENT DOCUMENTS

RU      2262661      10/2005

OTHER PUBLICATIONS

"A Combined Corner and Edge Detector" Harris, et al, Proc. Alvey Vision conf., Univ. Manchester, 1988, pp. 147-151.

(Continued)

*Primary Examiner* — Ranodhi Serrao
*Assistant Examiner* — Thomas Richardson
(74) *Attorney, Agent, or Firm* — Brundidge & Stanger, P.C.

(57) ABSTRACT

Binarization is performed using a threshold image obtained by multiplying a variation in each pixel value of an input image with a coefficient. Although the variation is time-averaged based on an update coefficient for each pixel, the update coefficient is switched depending on whether or not a relevant pixel belongs to the object. Subsequently, from the binary image, an initial detection zone is formed and a spatial filtering process is performed thereto. The spatial filtering process includes at least one of skeleton analysis processing, object mask processing, morphology processing, and section analysis processing. For a tracking zone, the temporal positional change thereof is tracked, and the noise is reduced. Some of the tracking zones are removed, and the remaining zones are integrated into a cluster, and furthermore the cluster selection is performed based on the dimensions in real space.

6 Claims, 10 Drawing Sheets

U.S. PATENT DOCUMENTS

| | | | |
|---|---|---|---|
| 2004/0246336 A1* | 12/2004 | Kelly et al. | 348/143 |
| 2008/0030579 A1* | 2/2008 | Kelly et al. | 348/154 |
| 2008/0100709 A1* | 5/2008 | Furukawa | 348/169 |
| 2008/0211907 A1* | 9/2008 | Kelly et al. | 348/143 |

OTHER PUBLICATIONS

"Distinctive Image Features from Scale-Invariant Keypoints" by D. Lowe, Journal of Computer Vision, 60, 2m 2004, pp. 91-110.

"Simple Gabor Features Space for Invariant Object Recognition" by V. Kyrki, et al, Pattern Recognition letters 25, No. 3, 2004, pp. 311-318.

"Visual Pattern Recognition by Moment Invariants" by M. Hu, IRE Transactions on information theory, 1962, pp. 179-187.

"Invariant Object Detection Based on Evidence Accumulation and Gabor Features" by Park, et al., Pattern Recognition letters 22, pp. 869-882.

* cited by examiner

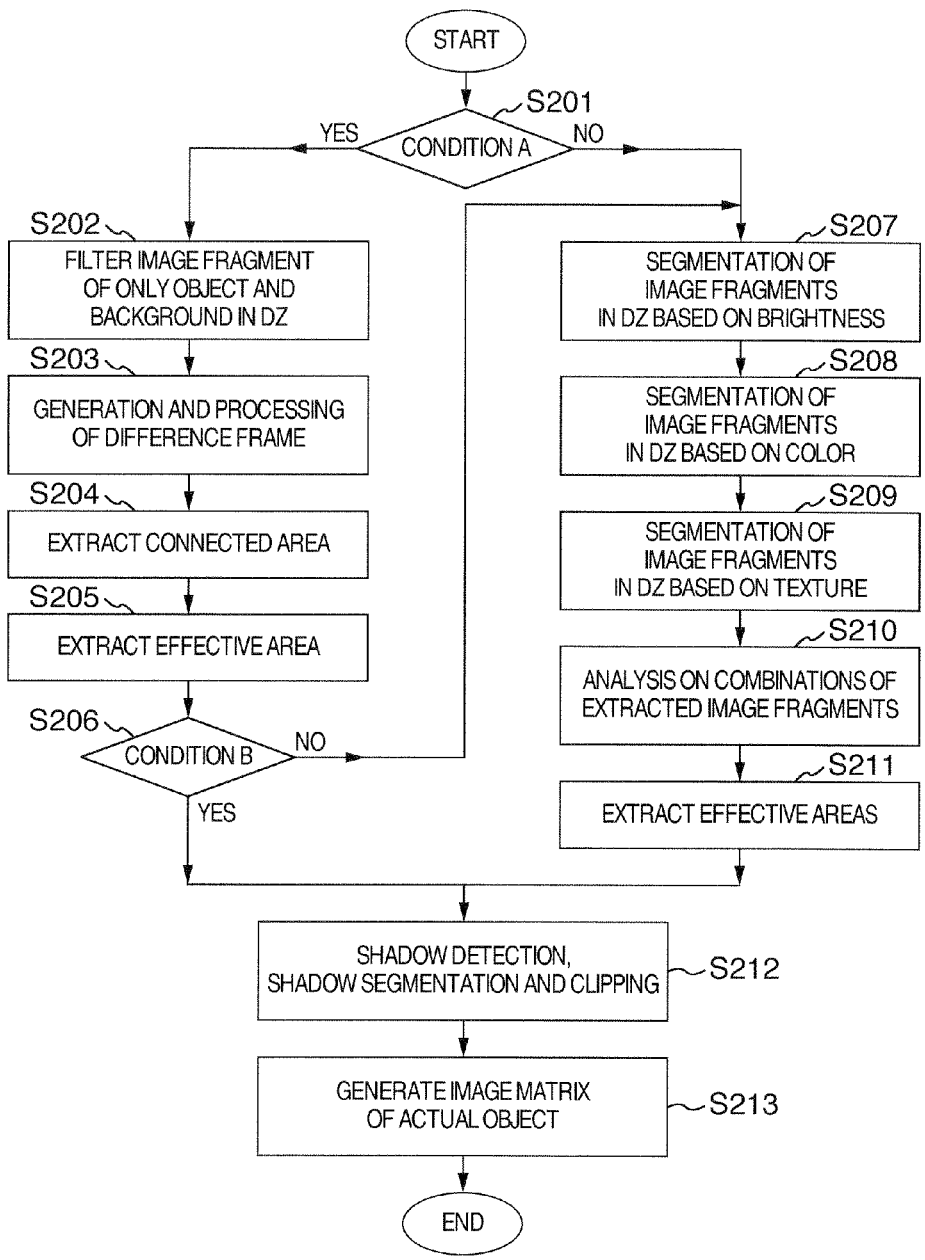

IN [AREA 1],
    IF AN OBJECT [CAR] IS RUNNING AT A [SPEED]
    [NO MORE THAN 20 km/h] AND ITS [DIRECTION] IS EQUAL
    TO [DIRECTION 1], THEN THE OBJECT IS PERMITTED,
    OTHERWISE [PROHIBITED]

[CAR] : =
    [WIDTH]=[NO LESS THAN 2 m]
    AND [WIDTH]=[LESS THAN 5 m]
    AND [HEIGHT]=[NO LESS THAN 1 m]
    AND [HEIGHT]=[NO MORE THAN 2 m]

(2) 402

[PERMIT] : =
    [POSITION]=[AREA1]
    AND [TYPE]=[CAR]
    AND [SPEED]=[NO MORE THAN 20 km/h]
    AND [DIRECTION]=[DIRECTION 1]

(3) 403

[INHIBIT] : =
    NOT [PERMIT]

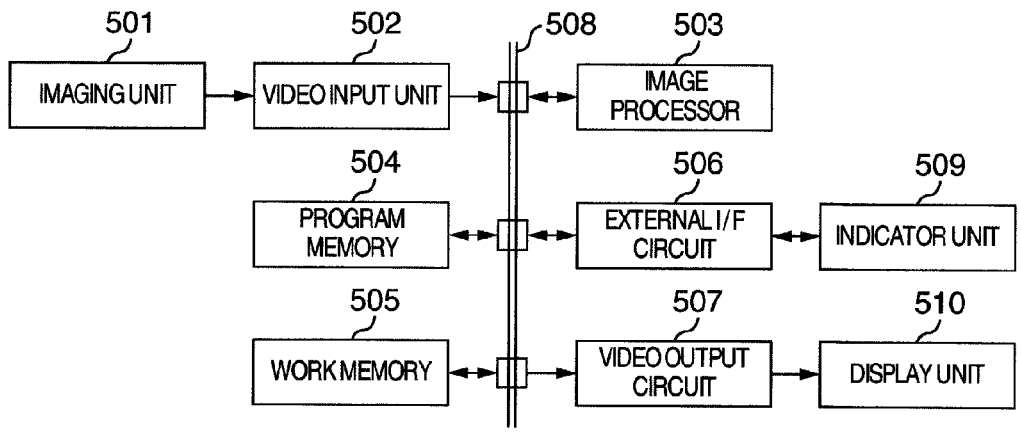

EXAMPLE OF SETTING A MONITOR AREA
IN CAMERA COORDINATE SYSTEM

EXAMPLE OF SETTING A MONITOR AREA
IN SCENE COORDINATE SYSTEM

EXAMPLE OF GENERATING A PROCESSED AREA TAKING INTO CONSIDERATION THE HEIGHT OF A MONITOR AREA

EXAMPLE OF IMAGING A TARGET OBJECT TO BE MONITORED

INTRUSION ALARM VIDEO-PROCESSING DEVICE

BACKGROUND OF THE INVENTION

The present invention relates to intrusion alarm video-processing devices, and in particular, relates to an intrusion alarm video-processing device that detects an intruder by processing a video shot with a monocular camera.

The conventional intruder alarm system is not satisfactory with regard to frequent false alarms, a lack of versatility, i.e., requiring delicate and labor intensive setting adjustment corresponding to monitoring stations. When classical tasks in image processing, such as segmentation, skeleton extraction, recognition, and detection, need to be realized, apparently, difficulties in developing a typical intruder alarm system are in large part due to the presence of various noises due to various kinds of sources.

Inexpensive CMOS sensors are used in almost all surveillance video cameras. However, in even the highest-performance sensor among these sensors, a certain hardware noise mixes into imaging data. There is an inverse correlation between the luminance level and the sensor noise level. Due to this noise, the same two images cannot be taken even if a camera and the environment to be imaged are not moving. Actually, the luminance value or the RGB value of a pixel is observed as a probability variable. Accordingly, the value of a pixel observed as the probability variable should be modeled with an appropriate method. It has been experimentally proved that the sensor noise can be appropriately modeled as white noise.

As a related art underlying the present invention, a moving vehicle detection method by Eremin S. N. is known (see RU (Russian) patent No. 2262661). This method comprises the steps of acquiring a frame, calculating an inter-frame difference, binarizing with a threshold, performing morphological operation, calculating a Sobel operator, storing an initial frame, and updating the background based on a special equation, detecting a difference between a frame and a background, calculating a histogram of images, detecting the maximum luminance, verifying by comparison with an existing object, separating a mixed object, locating a vehicle, and generating a rectangle that expresses a coordinate at which the vehicle may be located within a relevant framing means.

Moreover, as a related art in connection with the present invention, an image recognition method using a Hu invariant moment is known (see Ming-Kuei HU, "Visual Pattern Recognition by Moment Invariants", IRE Transactions on information theory, 1962, pp. 179-187).

Moreover, a method is known, in which Fourier Mellin transform or a Gabor filter is used as a scale invariable value and these are compared with a dictionary to recognize an object (see Park, H. J., Yang H. S, "Invariant object detection based on evidence accumulation and Gabor features", Pattern recognition letters 22, pp. 869-882, and Kyrki, V., Kamarainen J. K, "Simple Gabor feature space for invariant object recognition", Pattern recognition letters 25, No. 3, 2004, pp. 311-318).

Moreover, a corner detection method by Harris is known (see C. Harris and M. Stephens, "A combined corner and edge detector", Proc. Alvey Vision Conf., Univ. Manchester, 1988, pp. 147-151). In this approach, a detected corner is used as a feature quantity. Any object has a unique set of corner points. Recognition processing is performed by comparing with a positional relationship of corners which an object in a standard image has.

Moreover, there are known a method of applying a Gaussian filter to an image in multi-stages and preparing difference image groups thereof (Laplacian pyramid) (see U.S. Pat. No. 6,141,459), and SIFT (Scale-invariant feature transform) that extracts a scale invariable feature quantity, such as a key point, from the maximum value of these image groups (see David G. Lowe, "Distinctive image features from scale-invariant key points, Journal of Computer Vision, 60, 2, 2004, pp. 91-110).

SUMMARY OF THE INVENTION

The drawbacks of the above-described respective methods are to erroneously detect a shadow as an object (an intruder, a vehicle, or the like), and incapability to determine the actual size of an object. Other drawback is that when an object (or its position), which is brought into the field of view and left behind, is erroneously detected, the updating of a background model in an appropriate pixel is completely stopped and as a result a static object cannot be automatically integrated into the background. For this reason, a false alarm or a detection omission occurs under the presence of a disturbance caused by continuous changes or a temporary change in illumination, leaves, and the movement of water surface, or rainfall (rain, snow, or the like). Moreover, sufficient consideration has not been paid to a periodic background fluctuation, such as a-flicker, or to the tracking within an area where the illuminance varies greatly from place to place.

It is an object of the present invention to reduce the number of false responses and improve the detection accuracy of the boundary of a moving object, thereby improving the quality of a TV surveillance security system under the complex climate conditions and the varying background, and furthermore extending the functionality or the operability.

An intrusion alarm video-processing device of the present invention uses a background difference method based on a parametric model. That is, every time an image frame is input, the absolute value of a difference between the input image of the current frame and a background image is calculated, and is then binarized using a threshold image. For the threshold image, the variance $\sigma^2$ in each pixel value of the input image multiplied by a predetermined coefficient $k_1$ is used. Although the variance $\sigma^2$ is time-averaged based on an update coefficient $\rho$ for each pixel, the update coefficient $\rho$ is selected as the different value depending on whether a relevant pixel belongs to the background or belongs to the object.

Subsequently, an initial detection zone is formed from the binary image and a spatial filtering process is performed thereto. The spatial filtering process includes at least one of skeleton analysis processing, object mask processing, morphology operation, and section analysis processing. The skeleton processing includes a process to obtain shape information of the initial detection zone by a thinning process or skeleton processing with respect to the binary image, a process to extract main axes from the shape information, and a process to extract the axes of the object from the extracted axes.

The object mask processing includes a process to extract the border area that is not adjacent to the border of the initial detection zone of the binary image. The morphology processing includes an expansion process to convert a pixel adjacent to a white pixel of a binary image to a white pixel, and an contraction process to convert a pixel adjacent to a black pixel of a binary image to a black pixel. The section analysis processing includes a process to divide the initial detection zone into segments, a process to analyze the ratio of white pixels of the binary pixels with respect to each segment, and a process to select segments based on the ratio of white pixels. Subsequently, a tracking zone that expresses the independent part of the object is formed.

For the tracking zone, a temporal positional change of a tracking zone of interest is tracked using at least one of the following methods; a tracking method based on characteristic information, such as the existence position and size, the center of gravity, the contour feature of the image, and the moment; and a tracking method based on the line component extraction approach represented by Hough transform or the like, in which a line component is extracted from the temporally arranged binary spatio-temporal data obtained at each time point. The tracked result is subjected to at least one of smoothing filtering, a moving-average filtering, and Kalman filtering, and thus a component due to noise is reduced from the calculated positional change.

Some of the tracking zones are removed, and the remaining zones are integrated into a cluster, and furthermore the cluster selection is performed. The cluster selection is determined based on the size of a cluster, the position coordinate of a cluster, the displacement from an area having a specified shape, the displacement from an area lying a predetermined distance or less away from a certain cluster. This determination is made after converting to the dimensions in real space by coordinate conversion. This conversion is calculated using the conditions of the image sensor of a camera and the camera parameters at a mounting position. Eventually, a cluster selected and remaining is judged as an object to be detected.

Other than the intrusion alarm video-processing devices as described above, intrusion alarm video-processing devices with some of the constituent elements thereof replaced with the ones in other known art may be included in the present invention.

The intrusion alarm video-processing device of the present invention can accurately detect a monitored object from a video even if there are various kinds of regular, temporary, or periodic disturbances, such as the climate conditions, inactive (abiological) movement, or a fluctuation in the artificial image.

Other objects, features and advantages of the invention will become apparent from the following description of the embodiments of the invention taken in conjunction with the accompanying drawings.

BRIEF DESCRIPTION OF THE DRAWINGS

FIG. 6 is a flowchart of object segmentation (OS) process (Embodiment 4).

FIG. 7 is an example of monitor conditions (Embodiment 5).

FIG. 8 is an example of monitor conditions (Embodiment 5).

FIG. 9 is an example of an equipment configuration (Embodiment 5).

FIG. 10 is an example of a decision table (Embodiment 5).

DETAILED DESCRIPTION OF THE EMBODIMENTS

Figure 1:
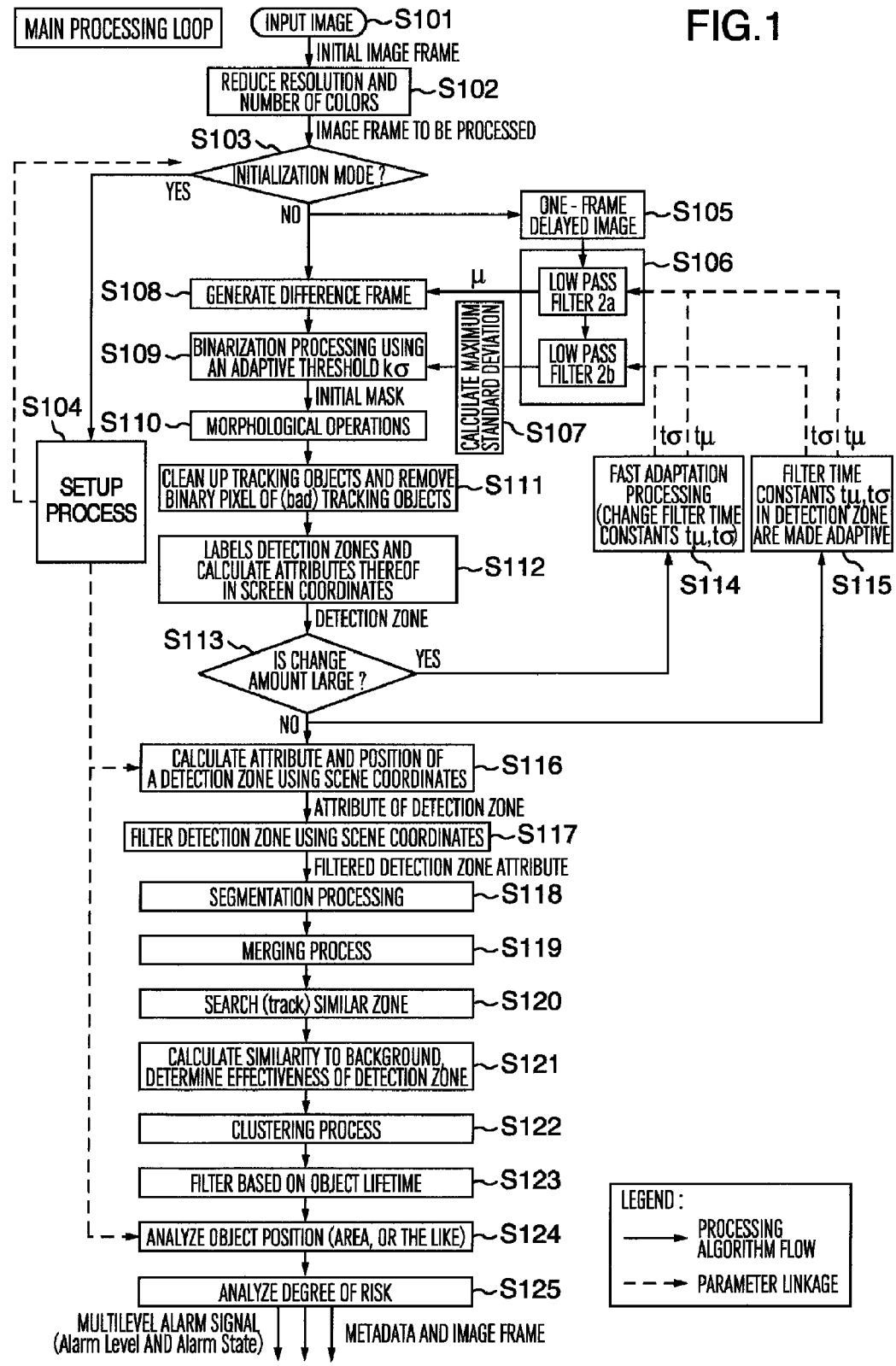
FIG. 1 shows the main processing loop of an intrusion alarm video-processing device (Embodiment 1).

General Logic of a Video Monitoring System Function

In order to realize the main goals, first, the general logic for the operation of an intrusion alarm video-processing device according to an embodiment of the present invention need to be determined.

In order to solve the related-art problems, the evaluation of an observed environmental change and the data analysis in the prediction level are required. In accordance with such analysis result, the observed situation is evaluated as the one to be alarmed (a possible threat). Depending on the degree of risk in the situation (also taking into consideration the prediction), a response of one video monitoring system or either one of the other video monitoring systems will be formed. The feature of this system is that the response from the system is made similar to that from a human operator.

As a result, the processing logic of the video monitoring system is the logic itself in detection, prediction, and removal (screening) of a threat to an article. Development of the processing logic is based on the formalization of alert and hazardous situations. Under actual conditions, for the formalization of situations, the number of false alarms can be reduced by the integration analysis and by grouping current situations into one of the classes ("problematic", "dangerous", "very dangerous"). It is a natural way to develop the processing logic relying on the judgment of a person who experienced the monitoring tasks. While looking at a plurality of complex scenes in which environmental changes occur, he/she pays attention to an object that may be a direct threat to a protected article, and tries to predict a change of scenery while paying attention to the speed or direction of a questionable object.

Identifying a moving object (or an object left behind) from a complicated background in a scene, in which noise in the natural world exists, should be carried out before assessing the current situation.

Then, the compound function of this system can be divided into four main stages below:

1) Adjustment
2) Initial detection (preliminary detection)
3) Analysis on the status, taking into consideration a detection object
4) Alarm and analysis on metadata.

"Adjustment" includes the following items:

1) Algorithm adjustment (parameter setting for video-data processing)
2) Camera setting adjustment (setting and adjustment of camera setting parameters)
3) Zone adjustment (selection and indication of a different "zone of interest" corresponding to a surveillance scene).

"Initial detection" means evaluation of a difference between a "background" and the current video frame. The main object in this stage is to detect all the differences as much as possible based on a selected criteria (threshold). The quality of detection (detection of a difference from the background) is conditioned in the initial detection stage. Here, although we may have a number of erroneous detections, the amount thereof will decrease in the next stage. The algorithm of the initial detection is a processing with respect to the luminance value (having 0-255 values for each of three channels of RGB colors) of a pixel.

"Analysis on the status" is required to reduce the amount of erroneous detections. The first step in the status analysis is to neglect an object without need to be alerted and without need to be closely watched. Implementation of this step in this system includes the following items:

1) Evaluation of the size of an initially detected object
2) Evaluation of the shape of an initially detected object
3) Evaluation of the value of "collation with the background" of an initially detected object (i.e., not the processing of the luminance value of one pixel but the processing of the characteristics of the whole pixels corresponding to a detection object is performed)
4) Evaluation of the life time of an initially detected object
5) Evaluation of the speed of an initially detected object.

For the purpose of further evaluation of the object behavior, the status recognition, and the generation of a corresponding response, the following shaped areas within the camera imaging range are used:

1) Polygon area
2) Pillar area
3) Perpendicular plane area

A separate degree of risk can be set to each of the zones, respectively.

Embodiment 1

First, the main terms used in the description of this embodiment are defined.

Current frame (image): one frame of image obtained from a video input in the current processing cycle Background frame (image): an image obtained by successively averaging (smoothing) the luminance value of each pixel within an image frame. These calculations are performed using a low pass filter 106a (described later).

Standard-deviation frame: an image obtained by successively averaging (smoothing) the variance of the luminance value of each pixel within an image frame. These calculations are performed using a low pass filter 106b (described later).

Frame difference (image): an image resulting from an image difference between the current frame and the background frame.

Binary frame (image): an image resulting from the binarization of a difference image frame, and is obtain by comparing the difference frame with a standard deviation frame for each pixel.

Foreground pixel: a pixel within the current frame and contained in a non-zero zone (zone having a pixel value of zero or more) in a binary image frame Background pixel: a pixel within the current frame and contained in a zero zone (zone having a pixel value of 0) in a binary image frame Note that, although a frame is the unit constituting one image, it may be used synonymously with an image.

FIG. 1 shows a main processing loop of Embodiment 1. The initial detection phase covers from input of an image frame (Step 101) to a binarization process (Step 108).

In Step 101, an input frame just shot with a camera is input. Step 101 is activated via an event handler by a timer event, thereby starting the main processing loop. The input image is in a YUV 4:2:2 format, for example.

In Step 102, the resolution and/or the numbers of colors of an input image are reduced to the ones in a format suitable for real-time processing. In this embodiment, the input image is converted to one byte of gray scale image per pixel because the later-described several functions support only RBG or one-channel gray scale. YUV, HSB (HSV), or other format may be appropriate. The resolution corresponds to a plurality of formats and is reduced to 360×240 pixels, for example. In this Step 102, a process to adequately blur an image with a low frequency spatial filter is also performed before or after the reduction of the resolution and/or the numbers of colors. For example, Gaussian filter is suitable for high speed processing because it can perform calculations in the x direction and in the y direction, separately. Or, a median filter that employs a median within 3×3 pixels may be used. Finally, the gain is controlled so as to uniform the luminance (average) in a predetermined area within an image.

In Step 103, if it is the initial operation of the main processing loop, the loop is branched to a setup (setting) process (Step 104). In Step 104, the later-described various constants (parameters) are set, and also the setting is made for specifying what kind of alarm is issued when an object of what kind of size, speed, and locus is detected in a detection area of what kind of shape and position. Some of these settings are provided using the values of real space coordinates (scene coordinate system) instead of screen coordinates. The details will be described in Steps 124, 125.

In Step 105, the prepared (reduced) frame is stored to be used as one-frame delayed image.

In Step 106, two types of low pass filter processings are performed using the prepared current image and one-frame delayed image. In this embodiment, the background image is modeled as a stochastic process having an unknown average and standard deviation. A time domain low pass filter is used to evaluate (estimate) the moment thereof.

The low pass filter 106a regularly updates the evaluation of the average of each pixel. The moving average is calculated (as in Equation (1) below) every time a new frame is input.

$$B_i = \mu_i = (1-\rho)\mu_{i-1} + \rho I_i \quad (1)$$

Where, $I_i$ denotes the current image, and $\rho$ denotes a filter constant (0<$\rho$<1), and i denotes the index of a frame. The result of the low pass filter 106a is referred to as the background frame.

The filter constant has the following meaning. Now, consider the number of image frames required to capture a new object into the background. If this capture is too fast, we may miss an object (to be detected) that does not move such fast. For example, in the case of $\rho=1$, the current (new) image frame immediately becomes a new background image frame, while in the case of $\rho=0$, the first image frame remains as the background image frame and the background image frame will not be updated any more. Actually, we want to realize a (successively) moderate-updating of the background and a process of smoothing an abrupt change in the luminance value. First, T is defined as a preferable cycle (interval) of perfect update of the background image frame. If T is defined as the number of processing frames (not in the unit of seconds), $\rho$ is given by $\rho=5/T$. For example, if perfect updating of the background is executed within 1000 processing frames, the filter constant is set as $\rho=0.005$.

The low pass filter 106b successively calculates an estimated standard deviation $\sigma$ of each pixel using the same method.

$$\sigma_i^2 = (1-\rho)\sigma_{i-1}^2 + \rho(\mu_i - I_i)^2 \quad (2)$$

Note that the background frame or the current frame may be that of one frame before (the frame with the index of i−1). As described later, $\rho$ is switchable for each pixel depending on the types of a zone or various kinds of conditions (e.g., luminance). ρ may be varied between the low pass filters 106a and 106b, and is denoted as $\rho_a$ and $\rho_b$ in this case, respectively.

Actually, the estimated standard deviation σ is stored as $\sigma^2$ (i.e., variance) on a memory in order to avoid square root calculation, and is handled as the squared value itself until the binarization processing.

In Step 107, the temporal maximum value σ' of the standard deviation σ (or variance) which the low pass filter 106b calculated is calculated and held for each pixel. Although the maximum value σ' may be successively searched from a predetermined number of past frames, it can be calculated also from Equation (3) below.

$$\sigma'_i = \begin{cases} (1-\rho_m)\sigma'_{i-1} + \rho_m\sigma_i, & \text{when } \sigma_i < \sigma'_{i-1} \\ \sigma_i, & \text{when } \sigma_i \geq \sigma'_{i-1} \end{cases} \quad (3)$$

In Step 108, the difference frame is generated using the prepared current image and background image. The change detection algorithm of this embodiment is based on the absolute value of the image difference frame between the reduced input image $I_i$ and the background image $\mu_i$ (or $\mu_{i-1}$) generated by the low pass filter 106a.

In Step 109, this difference frame is binarized using an adaptive threshold $k_1 \sigma$. The standard deviation is used as an adaptive part of the binarized threshold, here.

$$|I_i - B_{i-1}|^2 > k_1^2 \sigma_{i-1}^2 \quad (4)$$

Where, k is a constant selected in the setting stage (Step 104). A recommended value ranges from 3 to 4 and is determined depending on the quality of noise. The result of the binarization processing is obtained as a binary image, where "0" (False) means that nothing is detected, and "255" (True) denotes a detected pixel. If the image has been handed as a color image until this step, integration of color channels is also performed here. For the integration, the color channels may be subjected to weighted-summation before binarization or the color channels may be combined by logical sum (OR) after binarization. The binary image (or an area of a true value within the binary image) obtained in Step 109 is also referred to as the initial object mask.

Steps 110 to 123 are the phases of "status analysis".

In Step 110, morphological operations are applied to the initial object mask. The morphological operations include four basic operations as follows: a dilation process to compute logical OR while shifting an image within a predetermined range, an erosion process to compute logical AND, an opening process to carry out the erosion process after the dilation process, and a closing process to carry out the dilation process after the erosion process. The opening process has an effect to connect adjacent "255" (True) pixels together, while the closing process has an effect to remove point-like "255" (True) pixels. Either one of them is used in this embodiment.

In the initial object mask, the morphological operations cannot sufficiently remove the case where a false value hole occurs in an area of connected true values. For this reason, a hole filling process may be carried out, in which a false value area surrounded by true values is detected and then this area is filled with true values.

In Step 111, bad traces (tracking) are cleaned up and the (binary pixels of) background image (causing this bad traces) are removed. That is, if an erroneously detected tracking zone in Step 120, 122, or the like of the foregoing processing cycle has been already found, pixels within this tracking zone in the initial object mask are disabled (are set to values other than 255), and at the same time the inside of this tracking zone in the current frame is replaced with that of the background image and corrected. With this step, the object mask is completed. In addition, the original current-frame is also stored separately.

In Step 112, labeling of preliminary detection zones and calculation of the attributes thereof are carried out. The labeling is an approach to find and mark (label) all the connected areas within an image. In this stage, a unique number is given to a connected area comprising pixels having true values within a binary image, and this connected area is subsequently handled as a preliminary detection zone "DetZones" ($Dz_0, Dz_1, \ldots$) having circumscribed rectangular coordinates (four coordinates of the up, down, left, and right) and an area (the area of the inside of a connected area or the number of connected pixels).

In Step 113, when the luminance abruptly changes due to any incident (clouds, illuminating a streetlight, or the like), the main processing loop is branched to a fast adaptation mode (Step 114). In this example, when a total area sum of the detection zones in the whole image frame or a total area sum of the detection zones inside a "fast adaptation zone" becomes larger than a preset threshold, the main processing loop is branched. In this example, the fast adaptation mode will be maintained for several periods. This period (specified by the number of frames, not by time) is also preset.

In Step 114, if it is in the fast adaptation period, such a value that can totally replace the background image by the end of the fast adaptive processing duration time will be assigned to the filter constant. For example, if the duration time of 50 processing frames is set in the fast adaptive processing, the filter constant ρ becomes equal to 0.1. In this way, the fast adaptive processing can avoid an erroneous detection caused by an abrupt change in the background. Detection of a questionable object during the fast adaptive processing (in Step 116 and thereafter) is not carried out.

In Step 115, the filter constants used for detection zones are made adaptive. The binary image is used in order to separate a pixel (having the value of 255 in the binary images and referred to as a foreground pixel), in which a questionable object may be detected, from a pixel (having the value of zero in the binary images) in which only the background is detected. The filter constants of the low pass filters 106a, 106b with respect to the foreground pixel are changed so that the speed at which the (erroneously detected) foreground pixel becomes the background may become 10 times slower as compared with other pixels of the image frame. That is, the above description of ρ is applied to $\rho_1$, and ρ is redefined as follows.

$$\rho = \begin{cases} \rho_1, & \text{when pixel is grouped as the background} \\ k*\rho_1, & \text{when pixel is grouped as the object} \end{cases} \quad (5)$$

In this embodiment, k=0.1. Accordingly, the system can prevent the actual object from being reflected on the background image for a long time as compared with a case without this local adaptive processing. As compared with the fast adaptive processing, this processing can avoid the oversight of an object that stops or is moving at a low speed.

Figure 2:
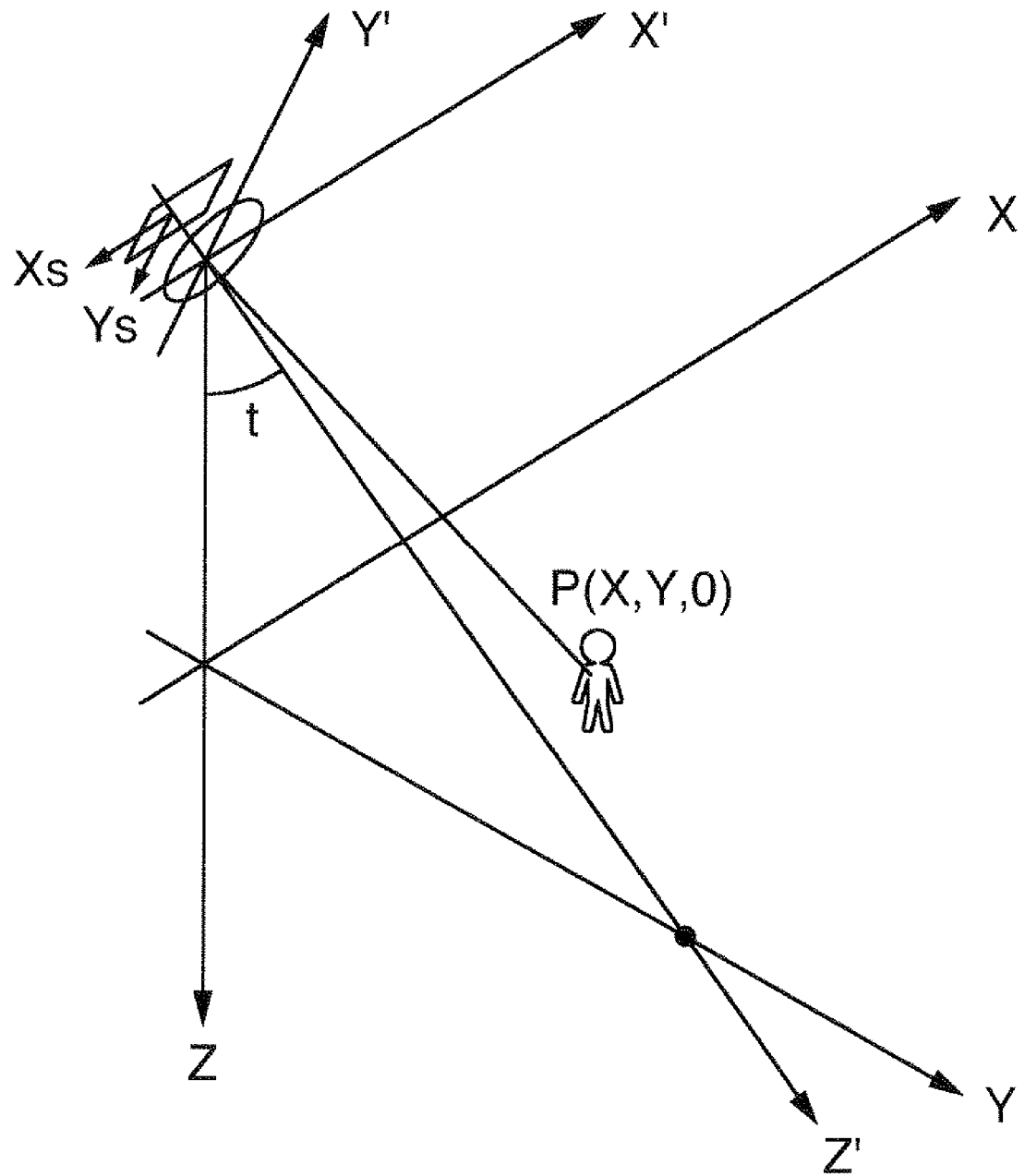
FIG. 2 is a view illustrating scene coordinates, camera coordinates, and screen coordinates (Embodiment 1).

In Step 116, the geometric attributes of a preliminary detection zone (analysis zone) are calculated. The geometric attributes include the position and size (width and height) of a detection zone expressed with the scene coordinate system. Consider the following coordinate system (FIG. 2).

X, Y, Z: scene coordinate system (world coordinate system). The X-Y plane is parallel to a floor surface (ground), and this level ranges from 0.5 to 0.7 m.

X', Y', Z': camera coordinate system. X', Y' axes are parallel to a target focal plane, X' is parallel to the X axis, and Z' is equal to the optical axis of a camera.

Xs, Ys: image (screen) coordinates, which are similar to the X'-Y' plane, but the unit thereof is in pixel, not in meter.

The height of a camera is denoted by h, and the gradient of the camera optical axis with respect to the X-Y plane is denoted by t. An object P positioned in a scene denoted by X, Y, and Z coordinates (Z=0) is converted to the camera coordinate system by Equation (6) below.

$$X' = X$$
$$Y' = Y \times \cos(t) - h \times \sin(t)$$
$$Z' = Y \times \sin(t) + h \times \cos(t) \quad (6)$$

The screen coordinates of the object are given by Equation (7) below using projection optics equations.

$$Z' \times X_S = f_i \times p_X \times X'$$
$$Z' \times Y_S = f_i \times p_Y \times Y' \quad (7)$$

Where, $f_i$ denotes a focal length and $p_x$ [m$^{-1}$] and $p_y$ [m$^{-1}$] denote the picture element density in the $X_s$ and $Y_s$ directions, respectively, and $f = f_i \cdot p_x = f_i \cdot p_y$ is defined. These camera installation parameters are provided in Step 104. By replacement of the variable Z', $$X_S \times Y \times \sin(t) + X_S \times h \times \cos(t) = f \times X$$
$$Y_S \times Y \times \sin(t) + Y_S \times h \times \cos(t) = f \times Y \times \cos(t) - f \times h \times \sin(t) \quad (8)$$

is obtained, where the conversion equation is Equation (9) below.

$$Y = (f \times h \times \sin(t) + Y_S \times h \times \cos(t)) / (f \times \cos(t) - Y_S \times \sin(t))$$
$$X = (X_S \times Y \times \sin(t) + X_S \times h \times \cos(t)) / f \quad (9)$$

Since a camera may have been installed using a different method from that of FIG. 2, the rotation angle of the camera may need to be considered with respect to the Z axis and Z' axis. In this case, new coordinates are expressed with Equation (10) below.

$$\overline{X} = X \times \cos(a) - Y \times \sin(a)$$
$$\overline{Y} = X \times \sin(a) + Y \times \cos(a) \quad (10)$$

Where, a denotes the rotation angle with respect to the Z axis. Similarly, the screen coordinates are expressed with Equation (11) below.

$$\overline{X}_S = X_S \times \cos(a') - Y_S \times \sin(a')$$
$$\overline{Y}_S = X_S \times \sin(a') + Y_S \times \cos(a') \quad (11)$$

Here, a' denotes the rotation angle with respect to the Z axis.

In Step 117, a preliminary detection zone (analysis zone) that does not satisfy a predetermined size is blocked off (so as not to be passed to the subsequent processes). For each detection zone, the geometric attributes (e.g., the width and height in real space) in this scene coordinate system (X, Y, Z) are compared with predetermined values (e.g., $w_{min}=0.1$, $w_{max}=2$, $h_{min}=0.1$, $h_{max}=3$ that define the respective upper limit and lower limit), and then only a zone that satisfies the above values is filtered and stored in an array "SelZone". Moreover, a pixel of a preliminary detection zone in the current frame, the pixel not satisfying the above, is overwritten with that of the background frame.

In Step 118, segmentation of the preliminary detection zone having passed Step 117 is performed. The segmentation is required for the analysis on the level of "hole filling of a detection area". In order to calculate a new border of each filtered zone, all of the filtered zones (square areas of interest) are split in the shape of a strip with equal width. The upper side and lower side of this split zone are redefined based on the object mask, and the split width is defined in advance as a meter value in the scene coordinate system. Actually, the width is finely adjusted so as to be split into an integer number of widths and with equal width. Then, the split zones are stored as $Sz_0$, $Sz_1$, . . . and so on.

Figure 3:
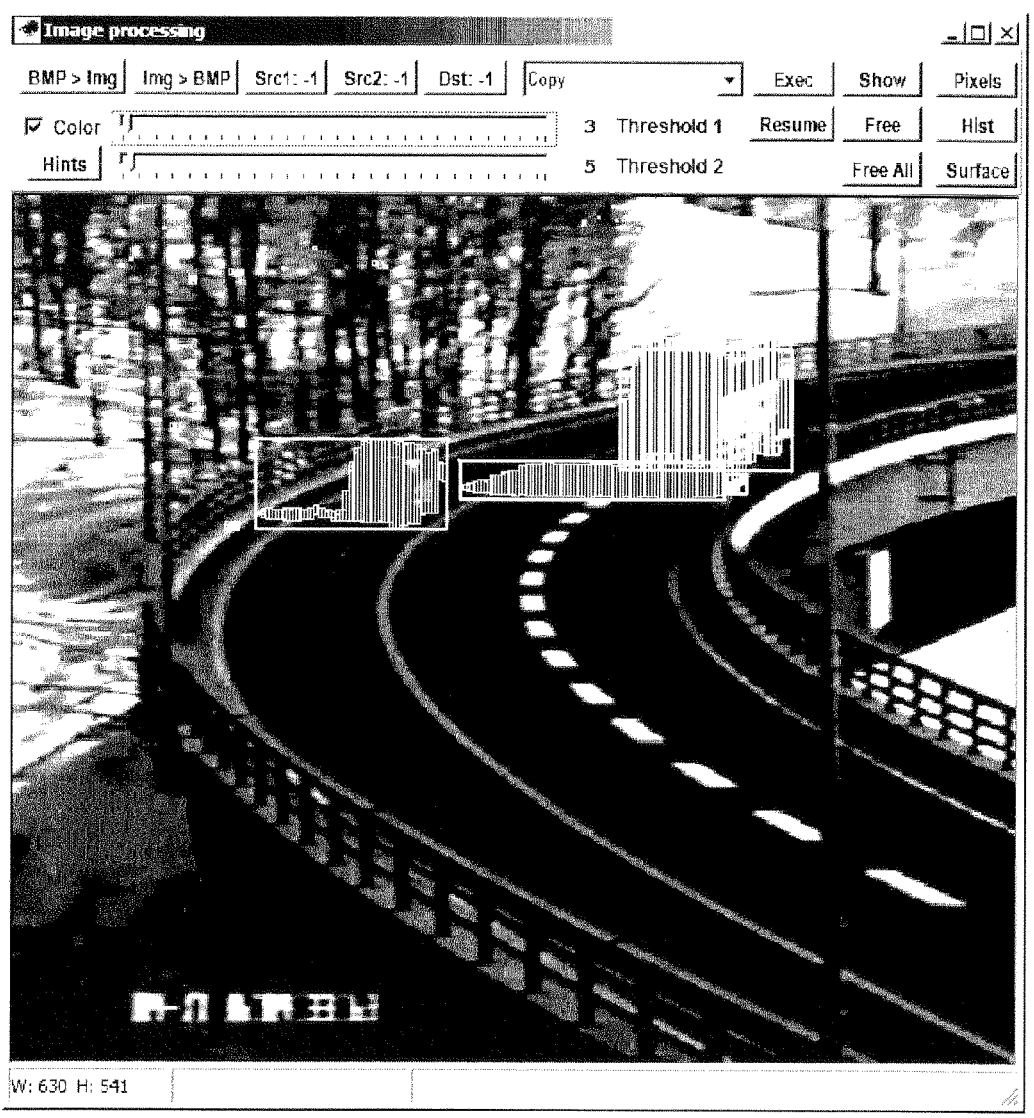
FIG. 3 is an image showing an example of a splitting process (S118) (Embodiment 1).

FIG. 3 shows a result of this segmentation. Rectangles drawn with a thick white line and vertically-long rectangles within the white rectangle express the result of segmentation and the re-calculated border, respectively. This reveals that the segmentation provides the contour of an actual vehicle and the contour of the actual shadow by setting the split width to 0.2 [m], for example.

In Step 119, a merge of the split areas is performed using the filling rate of an elongated zone (analysis zone). The merge is achieved by repeating the following first to third sub-steps until an unreferred split zone is gone.

First, a reference zone is searched. The reference zone is one of the above-described split zones, and is like the following one. That is, a zone (1) nearest to the center of the base of an image frame, (2) not contained in any of the merged groups, and (3) not used as a trial zone in the past.

Secondly, an elongated zone serving as a merged candidate is calculated from the attributes of the found reference zone. The elongated zone is a rectangle having a larger height than a predetermined height (e.g., 0.8 m for a person) in the scene coordinate system. The height in the metric unit is calculated from the height of a filtered zone (zone before splitting) based on a proportional relationship.

Thirdly, if $S_{cross}/S_{total}$>"Merge area overlapping ratio" is not satisfied, the elongated zone is incorporated into a merged group. Here, $S_{cross}$ is the area of a crossing area (common area) between a merged zone (circumscribed rectangle of a merged group) and an elongated zone, and $S_{total}$ is the area of the elongated zone itself. If the crossing area is 0, the above-described overlapping rate is calculated regarding the reference zone itself as the merged zone, and if the above condition is satisfied, a new merged group that regards the elongated zone as the first member thereof is created.

Finally, a merged group that sufficiently satisfies is registered with an array "Merge" as a merge zone. This condition is $S_{sum}/S_{merge}$>"Merge area filling ratio", where $S_{sum}$ is a sum of the individual area of an elongated zone included in a merged group, and $S_{merge}$ is the area (circumscribed rectangle) of a merged zone. "Merge area filling ratio" is 60%, for example. A merged group that does not sufficiently satisfy will not be registered with the array "Merge".

Figure 4:
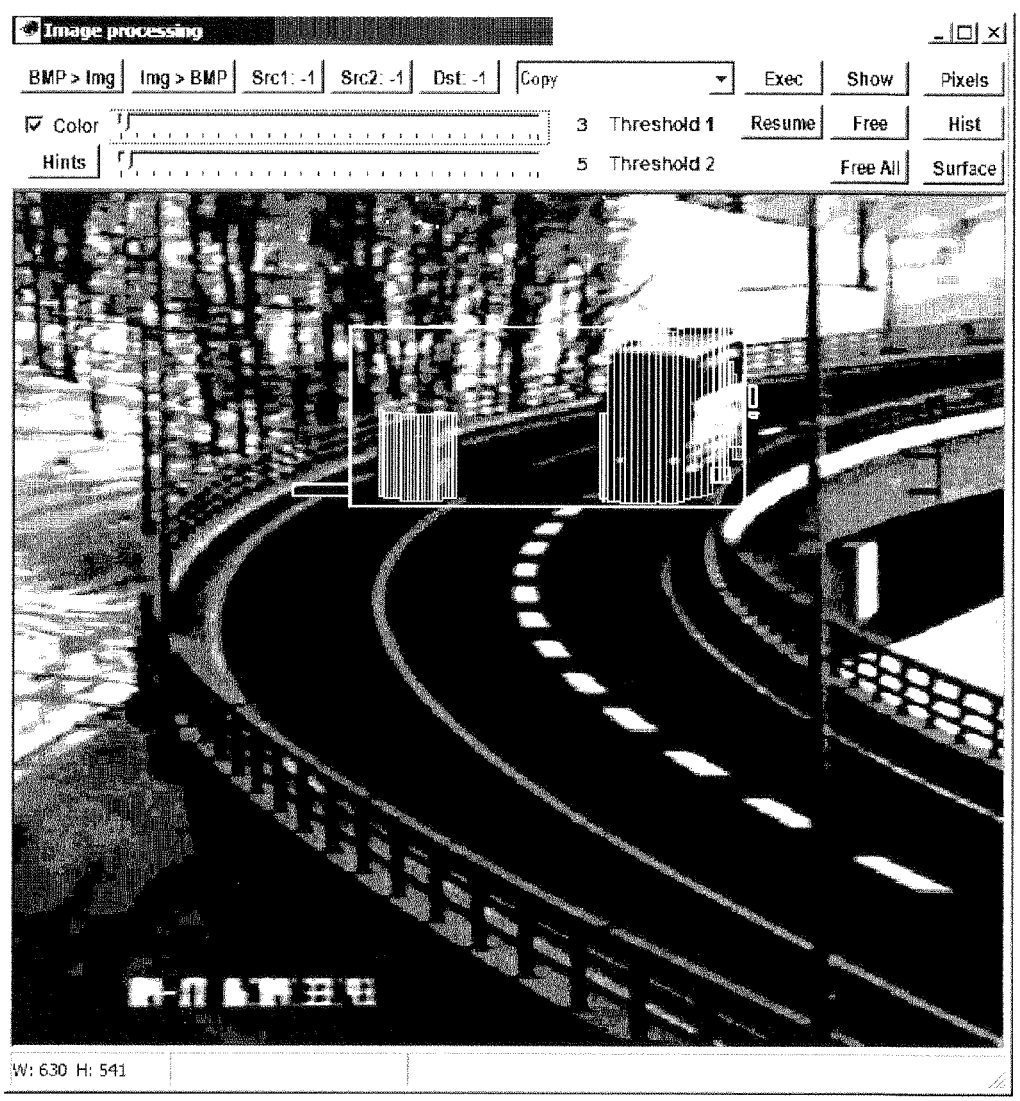
FIG. 4 is an image showing an example of merge processing (S119) (Embodiment 1).

FIG. 4 shows a result of the merge. A rectangle with thin lines expresses a split zone that is merged into one. It can be understood that only a high portion of the detection object passes the merge processing.

In Step 120, out of the previous frame, a location similar to the zone (tracking zone) registered with the array Merge and the degree of coincidence are calculated to update the array Trace. Tracking zones until the previous time are registered with the array Trace, and this processing is intended to check whether or not these zones stably exist in a series of processing frames, and to reduce an erroneous detection. In this step, for each tracking zone stored in the array Merge, the tracking zone is clipped from the previous frame (or the previous difference frame), and from the current frame, a search range of images are clipped, the search range being obtained by expanding the tracking zone by a specified amount, and then within this search area the following calculation is performed to search the maximum degree of coincidence.

$$\text{Collation} = (1 - D/G) \cdot 100\% \quad (12)$$

$$D = \sum_{i=1}^{n} \sum_{j=1}^{m} \delta_{ij} |a_{ij} - b_{ij}|$$

$$G = \sum_{i=1}^{n} \sum_{j=1}^{m} \delta_{ij} \max(a_{ij}, b_{ij})$$

$$\delta_{ij} = \begin{cases} 1 & \text{if } a_{ij} > 0, b_{ij} > 0 \\ 0 & \text{if } a_{ij} = 0 \text{ or } b_{ij} = 0. \end{cases}$$

Where, $a_{ij}$ denotes an element of a luminance matrix (image fragment) of a pattern, and $b_{ij}$ denotes an element of a luminance matrix (image fragment) of a search range. If each element has a plurality of color channels, a sum of the absolute value of a difference for each color channel, is used.

In a certain tracking zone, if the maximum degree of coincidence is larger than a value "Trace zone correlation coef", the position of a calculated tracking zone within the search range updates the array Trace as a new position of the tracking zone. If the maximum degree of coincidence is smaller than the value "Trace zone correlation coef" in the number of frames (iMissedFrameCnt), this tracking zone is deleted from the array Trace (and from the array Merge).

In Step 121, provision is made so that a tracking zone similar to the background may not be added to each tracking zone of the array Trace. That is, a new zone will be added to the array Trace only if the collation value with the background is smaller than "Trace zone correlation to backgr". Moreover, also if an overlap between a new zone and the existing zone is larger than a value iTRZoneOvrCoef, this new zone will not be added to the array Trace. The collation in this step may be carried out based on the degree of coincidence as in (Collation) in Equation (11) (Step 117), or other feature quantity may be used.

For the processings of Steps 120, 121, the calculation amount will abruptly increase as the zone becomes large. For this reason, an upper limit may be set to the zone size, whereby a clipped image may be shrunk so as not to exceed this upper limit. After Step 121, the array Merge is released from the memory.

In Step 122, each tracking zone of the array Trace is integrated into a cluster to create an array Cluster. The allowable life time and size are defined for the cluster, and the one satisfying these will be registered with the array Cluster. The integrating process is performed by the following first to fifth sub-steps.

Firstly, a cluster is created as a rectangular area that contains a group of tracking zones that exist in the vicinity respectively. The maximum allowable interval between tracking zones integrated into a cluster is denoted by Clustering factor, and is 5 pixels, for example.

Secondly, a process of connecting clusters, which are created in the current processing cycle and in the previous processing cycle (Cluster and ClustPre, hereinafter referred to as the current cluster and the previous cluster), is performed to create the following arrays.

MinT0Cur: denotes a previous cluster intersecting a certain current cluster Cluster[i] and having the minimum T0 (detection time) value CrQPre: the number of current clusters intersecting a certain previous cluster ClustPre [j]

CrQCur: the number of previous clusters intersecting a certain current cluster Cluster [i].

Thirdly, the data of the array Cluster is created from the above-described CrQCur, CrQPre, and MinT0Cur based on the following rules.

If only a certain previous cluster and a certain current cluster intersect with each other, then the ID, T0, and detection position of the previous cluster are inherited to the current cluster.

If a certain current cluster intersects with one or more previous clusters, then a new ID is given to this current cluster, and the T0 of the previous cluster having the smallest value T0 is inherited, and as the detection position the position of the current cluster is employed.

If a certain current cluster does not intersect with any previous clusters, then a new ID is given to this current cluster, the current time is given as T0, and as the detection position the position of the current cluster is employed.

Fourthly, the locus, speed (to be used in the subsequent step), or the like of a cluster are calculated and stored in the array Cluster.

Fifthly, the array Cluster of the current cluster is overwritten and stored onto the array ClustPre of the previous cluster.

In Step 123, each cluster of the array Cluster whose life time (which is a difference between T0 and the current time, and is in the unit of number of frames) exceeds a predetermined value (e.g., 40) is selected, and each cluster whose life time is no more than the predetermined value is dismissed (is not to be passed to the next process).

In Step 124, based on the detection area set in Step 104 and a relative position with each cluster, whether a cluster is inside or outside each detection area is determined. The detection areas include a polygon (cylinder) area (defined by the screen coordinates or the scene coordinates), a pillar area (defined by the scene coordinates, and the bottom of the pillar is the ground (X-Y plane), a circular area (defined by the scene coordinates on the ground (X-Y plane)), and a perpendicular plane area (defined by the scene coordinates, and preferable for a wall or a window). As the position of each cluster, the coordinate values (screen coordinates or scene coordinates) in the center of bottom of a cluster (in the ground portion, such as a person's leg) is used. A well-known algorithm is used in determining whether a cluster is inside or outside each detection area.

In Step 125, if the results of analysis and collation of the attributes (invariable values and the like of the foreground image of a cluster in addition to the position and the movement) of a cluster determined as being within the detection area satisfy the decision rules defined for the relevant detection area, a predetermined alarm is issued. Although the use of the invariable value (feature quantity) is not indispensable, HOG (Histograms of Oriented Gradients) or the like may be used, other than, for example, those shown in Ming-Kuei HU, "Visual Pattern Recognition by Moment Invariants", IRE Transactions on information theory 1962, pp. 179-187; Park, H. J., Yang H. S, "Invariant object detection based on evidence accumulation and Gabor features", Pattern recognition letters 22, pp. 869-882; Kyrki, V., Kamarainen J. K, "Simple Gabor feature space for invariant object recognition", Pattern recognition letters 25, No. 3, 2004, pp. 311-318; C. Harris and M. Stephens, "A combined corner and edge detector", Proc. Alvey Vision Conf., Univ. Manchester, 1988, pp. 147-151; and David G. Lowe, "Distinctive image features from scale-invariant key points, Journal of Computer Vision, 60, 2, 2004, pp. 91-110, as described above.

The examples of the decision rule include the following ones.

[Decision-Rule Name: Vehicles in a "Vehicle Off-Limits" Area]

An object is detected as a vehicle, and when it exists in a "vehicle off-limits" warning area (area where only access by a person is allowed), this object is judged as an illegal object.

[Decision-Rule Name: Person Inside a Vehicle-Specific Area]

If an object is detected as a person and exists in a "vehicle-specific" warning area, this object is judged as an illegal object.

[Decision-Rule Name: U-Turn]

In all the processing frames, the distance between the position of the locus of an object and the position of the current object is already calculated, and if this distance becomes smaller than the distance of the previous processing frame, then a "U-turn counter" of this object is incremented, while if this distance becomes larger than that, the counter is decremented. If this counter value exceeds a threshold ("the object almost stops in the threshold number of processing frames"), it is determined that this object is making U-turn. More preferably, the locus, to which a smoothing filter, a moving-average filter, a Kalman filter, or the like has been applied, is used, and a reversal of the velocity vector is judged at intervals from several tenth of seconds to several seconds.

[Decision-Rule Name: Fixed Time Zone]

Upon detection of an object within a fixed time zone, a time zone counter k3 of the object will increase. The time zone counter of the object will never decrease. If the counter exceeds a threshold $k3_{max}$, the object is judged as having stayed near a vehicle for a long time, and an alarm is sounded.

[Decision-Rule Name: Vehicle Stoppage (Temporary Time Zone)]

If an object is detected as a vehicle, and further is detected as being stopped, then a temporary time zone is created around the object (the outer circumference of the object cluster is expanded in the upward, downward, left, and right directions by the amount of a half the object size). In the time zone, it takes some time for the vehicle to become the background (this period is referred to as a time zone adaptation period). Subsequently, the zone becomes effective and the judgment operation is started. If the object is detected as a person in the time zone, the time zone counter k3 of the object will increase. The time zone counters of the object will never decrease. If the counter exceeds the threshold $k3_{max}$, the object is judged as having stayed near a stopped vehicle for a long time, and an alarm is sounded. If a vehicle is detected inside the time zone, a time zone removal process is started. It takes a while until the background within the zone is updated. During this period, within this time zone an alarm will not be issued. Upon completion of an "adaptation period for return", the time zone is deleted. In a processing frame in which the speed of a stopped object/an object moving at low speed falls below a threshold, a low-speed movement counter k2 is incremented. In a processing frame in which the speed of the object exceeds the threshold, the slow-speed movement counter k2 is decremented. If the counter value exceeds a threshold ("the object almost stops in the threshold number of processing frames"), it is determined that the object has stopped.

[Decision-Rule Name: Abandoned/Taken Away Object]

If a split of an object is detected (although there was one object in the previous processing frame, the object is now observed as two or more objects at the relevant position), all the "Split flags" of these objects are turned on. If it is determined that one of the objects has stopped and the split flag is being turned on, then this object is judged as an "abandoned or taken out object".

Embodiment 2

An intrusion alarm video-processing device of Embodiment 2 differs from Embodiment 1 in that TSV (Temporal Spatio-Velocity) transform or the like is used for object tracking. The device of Embodiment 1 is preferable to detect an intrusion of a certain object (a vehicle, a boat, a person) into a place where there are usually no people, while the device of Embodiment 2 is intended to detect an object doing questionable behavior among ordinary objects passing by.

TSV transform is based on the three-dimensional Hough transform with regard to spatio-temporal images such as consecutive time sequence frames. In this embodiment intended to obtain the locus of an object, a linear Hough transform is used. That is, lines are detected from a pixel value space defined on the three dimensions of two spatial dimensions (the vertical direction and horizontal direction of an original image) and a time dimension. As the image to be TSV transformed (referred to as the initial detection image), a sequence of difference images between adjacent frames as follows is used.

$$S(x, y, n) = \begin{cases} 1 & \text{if } \|I(x, y, n) - I(x, y, n - T)\| > Th \\ 0 & \text{else} \end{cases} \quad (13)$$

Where, S (x, y, n) denotes an initial detection image of the n-th frame, I (x, y, n) denotes an input image of the n-th frame, T denotes a time constant, and Th denotes a threshold (constant). Other than Equation (13), a contour detection image or the background difference image of Embodiment 1 may be used as the initial detection image.

In order to improve the quality, a 1×3 AND operator is used with respect to all the pixels of S (x, y, n) to obtain S*(x, y, n).

$$S^*(x,y,n)=S(x,y-1,n)\&S(x,y,n)\&S(x,y+1,n) \quad (13')$$

The notation of TSV transform is defined as follows.

$$V_n(x,y,v_x,v_y)=TVS\{S^*(x,y,n)\} \quad (14)$$

In Hough transform of this embodiment, an exponential decay filtering is applied to S*(x, y, n) in advance so that the weight of vote may decrease as the frame becomes older.

$$L_{n_p}(x,y,n)=S^*(x,y,n)F_{n_p}(n) \quad (15)$$

Where, S*(x, y, n) denotes a binary image of the n-th image frame, $n_p$ denotes the index of the current image frame, $F_{np}$ (n) denotes a filter expressed with Equation (16) below, where n<=$n_p$.

$$F_{n_p}(n) = \begin{cases} (1 - e^{-\lambda})e^{\lambda(n-n_p)} & n \leq n_p \\ 0 & n > n_p \end{cases} \quad (16)$$

The Hough transform with respect to LineA in time-space is expressed by Equation (17) below.

$$\begin{pmatrix} x \\ y \end{pmatrix} = (n - n_p)\begin{pmatrix} v_x \\ v_y \end{pmatrix} + \begin{pmatrix} p_x \\ p_y \end{pmatrix} \quad (17)$$

-continued
$$V_{n_p}(p_x, p_y, v_x, v_y) = \underset{LineA}{\text{Hough}}\{L_{n_p}(x, y, n)\}$$
$$= \sum_n L_{n_p}(v_x(n - n_p) + p_x, v_y(n - n_p) + p_y, n)$$

Where, (x, y) denotes a coordinate, $(v_x, v_y)$ denotes a velocity, $(p_x, p_y)$ denotes a reference position (e.g., position in the current frame of a known object), LineA denotes a line passing through a point $(p_x, p_y)$ and having a gradient $(v_x, v_y)$. The value of $V_{np}$ denotes the likelihood of a relevant line at a time point $n_p$.

In the case of an exponential-function expression, $V_{np}$ can be described using the regression equation below.

$$V_{n_p}(p_x,p_y,v_x,v_y) = e^{-\lambda} V_{n_p-1}(p_x-v_x,p_y-v_y,v_x,v_y) + (1-e^{-\lambda})S^*(x,y,n_p) \quad (18)$$

$p_x$, $p_y$, $v_x$, and $v_y$ are discretized to define a cell, and Equation (18) is totaled within each cell and is then binarized to a truth or a false using an appropriate threshold, and the binarized one is defined as $V^*_{np}(p_x, p_y, v_x, v_y)$.

Here, an inclined cylindrical equation of a movement model below is introduced.

$$C(x, y, n) = \frac{(x - a_x n^2 - v_x n - p_x)^2}{R_x^2} + \frac{(y - a_y n^2 - v_y n - p_y)^2}{R_y^2} \quad (19)$$

Where, the center of the cylindrical coordinates is $(a_x n^2 + v_x n + p_x, a_y n^2 + v_y n + p_y)$, and the horizontal radius and the vertical radius are denoted as $R_x$, $R_y$, respectively. The parameters of the cylindrical coordinates are defined by Equation (20) below.

$$a_x = \frac{\sigma_t^2 \tau_{t,t^2} - \tau_{t,t^2} \tau_{t,x}}{\sigma_{t^2}^2 \sigma_t^2 - \tau_{t,t^2}^2}, \quad a_y = \frac{\sigma_t^2 \tau_{t,t^2} - \tau_{t,t^2} \tau_{t,y}}{\sigma_{t^2}^2 \sigma_t^2 - \tau_{t,t^2}^2}, \quad (20)$$

$$v_x = \frac{\tau_{t,t^2} \tau_{t^2,x} - \sigma_{t^2}^2 \tau_{t,x}}{\sigma_{t^2}^2 \sigma_t^2 - \tau_{t,t^2}^2}, \quad v_y = \frac{\tau_{t,t^2} \tau_{t^2,y} - \sigma_{t^2}^2 \tau_{t,y}}{\sigma_{t^2}^2 \sigma_t^2 - \tau_{t,t^2}^2},$$

$$p_x = \bar{x} - a_x \bar{t}^2 - v_x \bar{t}, \quad p_y = \bar{y} - a_y \bar{t}^2 - v_y \bar{t}$$

$$R_x^2 = a_x^2 \sigma_{t^2}^2 + v_x^2 \sigma_t^2 - \sigma_x^2 + 2a_x v_x \tau_{t,t^2} - 2v_x \tau_{t,x} - 2a_x \tau_{t^2,x},$$

$$R_y^2 = a_y^2 \sigma_{t^2}^2 + v_y^2 \sigma_t^2 - \sigma_y^2 + 2a_y v_y \tau_{t,t^2} - 2v_y \tau_{t,y} - 2a_y \tau_{t^2,y}$$

Where, $\sigma_{k2}$ denotes the variance on the k axis, $\tau_{k,l}$ denote a covariance of k and l, and k bar denotes the average of k.

The cylinder density denoting the validity of the cylinder is defined by Equation (21) below.

$$r = \frac{N}{\pi R_x R_y h} \quad (21)$$

Where, h is the height (i.e., observed time) of a cylinder, and N is the number of TSV cells with a true value inside the cylinder.

In this embodiment, the initial detection based on the interframe difference described above is performed in parallel with the initial detection based on the background difference of Steps 106 to 115 of Embodiment 1. Moreover, Steps 120 to 121 of Embodiment 1 are deleted so as to move from Step 119 to Step 122, and in parallel therewith the TSV transform is performed. In Step 122, the locus information obtained by the TSV transform is compared with the array "Merge" obtained in Step 119, and the same processing as that of Embodiment 1 is performed.

Embodiment 3

An intrusion alarm video-processing device of Embodiment 3 differs from Embodiment 1 in that a skeleton processing is performed in place of or in addition to the segmentation and merge processings of Steps 118, 119 of Embodiment 1. The skeleton processing includes a process to obtain shape information of the initial detection zone by a thinning process or skeleton processing with respect to the binary image, a process to extract main axes from the shape information, and a process to extract the axes of the object from the extracted axes.

An image skel (A) obtained by performing the skeleton processing to an arbitrary image A is expressed by Equation (22) below.

$$skel(A) = \overset{K-1}{\underset{k=0}{Y}} \{er(A, kB) - \text{open } (er(A, kB), B)\} \quad (22)$$

Where, B denotes a structuring element (which is preferably circular), er (A, kB) denotes an operation of eroding A K-times with B, open (A, B) denotes an operation of opening A with B.

In this embodiment, as the image A, a binary image is used which is clipped with the preliminary detection zone (circumscribed rectangle) obtained in Step 117.

Figure 5A:
FIGS. 5A to 5F are images showing an example of skeleton processing (Embodiment 3).
Figure 5B:
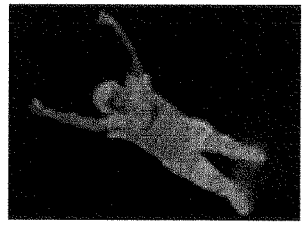
Figure 5C:
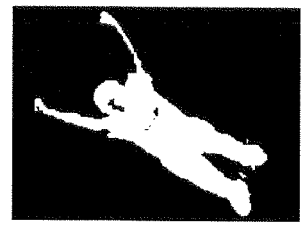
Figure 5D:
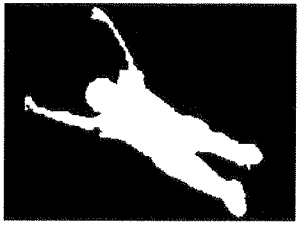

FIGS. 5A-5F are an image showing an example of skeleton processing of this embodiment. FIG. 5A shows an image of the current frame clipped with a preliminary detection zone containing an object (person), FIG. 5B shows a difference image corresponding to FIG. 5A, FIG. 5C shows a binary image of FIG. 5B, and FIG. 5D shows a thinned (filamented) image by the skeleton processing of FIG. 5C. In FIG. 5D, short thin lines are cleaned up (deleted) and the remaining basic thin lines are approximated with two bands having a constant width.

Figure 5E:
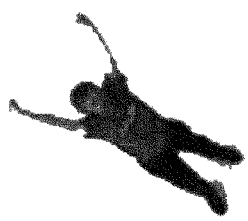
Figure 5F:
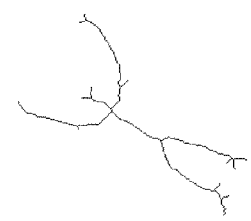

FIG. 5E is the result of this approximation, showing band's connected boundary. Using this band, a person and the basic axes of the shadow thereof can be determined, and furthermore the angle with respect to the vertical direction thereof can be calculated. If one of the angles of a band is approximately zero (almost vertical) and the other angle is within a predetermined range, it is determined that the other one is a shadow. By filling the binary images on the side of shadow with a false value, the binary images being divided by the connected boundary, an image in which only a person as shown in FIG. 5F is taken out is obtained.

After the object mask is corrected, the processes after Step 120 can be continued as in Embodiment 1.

Embodiment 4

An intrusion alarm video-processing device of Embodiment 4 performs a process (hereinafter, referred to as an OS processing) to extract a purer object from a preliminary detection zone in place of the segmentation and merge processings of Steps 118, 119 of Embodiment 1.

In this embodiment, the preliminary detection zone is a rectangular area that contains an object candidate within the binary images obtained by initial detection of an object, the rectangular area comprising a horizontal or perpendicular side. Hereinafter, this preliminary detection zone is referred to as DZ. The goal of the segmentation process in DZ is to express the pixel of a "pure" object, i.e., an object image without a pixel of the background as the recognition image. Mathematically, a matrix of images in DZ is an input for an object area splitting process of DZ, and a matrix of object images of DZ without the background is an output of the object area splitting process. A matrix of images typically serves as a matrix of three-dimensional vectors of a pixel comprising RGB components, which corresponds to a matrix of pixels within DZ in the original image.

The OS process of this embodiment is a combination of the following three methods.

(1) A difference analysis method performing difference analysis on an image fragment in which an object is detected and an image in which an object does not exist (background image) in DZ.

(2) An image fragment extraction method based on brightness, color, texture, or the like.

(3) A segmentation and shadow clipping method

FIG. 6 is a flowchart of the above method (1), which is performed to each DZ.

As Step 201, it is determined whether or not the background (precisely speaking, the background that can be divided in Steps 202 to 206) is contained in a target DZ. If the background is not contained, the flow moves to Step 207 because Steps 202 to 206 are meaningless.

As Step 202, filter processing of the current image and background image in DZ is performed. This process includes a median filter processing, the so-called cell discretization processing (hereafter, referred to as a CD (Cellular Dilation) processing) by image expansion processing, and a low pass filter processing (smoothing process).

The CD processing comprises a process to convert each pixel of the original image to a square image fragment comprising similar pixels including the peripheral two to three or more pixels of the relevant pixel. This process is useful to keep the size of DZ as small as possible.

If a combination of the median filter processing (to be performed before CD) and the low pass filter processing (to be performed after CD) is used in the CD processing, the enlargement of an image in DZ and the reconstruction of a small and low quality image to a certain level can be performed simultaneously. These processes are simultaneously carried out to the current image frame and the background image (reference image) frame in each DZ, respectively.

As Step 203, a difference frame (DF) in DZ is created and processed. This is performed by two separate processes: a process to create DF in each DZ from the filtered current image (containing the object) and the background image (not containing the object) by Step 202; and a DF binarizing process using an appropriate pixel value threshold. The DF creating process is a simple subtraction processing of each element of a filtered image matrix with respect to the current image and the background image in DZ. In processing a color image, a difference between vectors is determined by the calculation result of the magnitude of the vector. In the binarization processing, the same processing as that of Step 109 of Embodiment 1 is performed using a predetermined threshold.

As Step 204, a connected-area extracting process is performed. The connected (integrated) area extracting process is a process to extract an area connected as one block within each DZ and having a predetermined size (number of pixels) or a size larger than the predetermined size. This process is the same as that of Step 112 of Embodiment 1.

As Step 205, an effective area is extracted from a plurality of connected areas that are extracted in Step 203. As the candidate for the effective area, the largest (judged based on the number of pixels) connected area is selected, and this is denoted as ArM. Then, a process to fill a hole existing within the ArM is carried out.

In order to do it, first, the reverse image having only ArM is created.

Next, a connected area that is not adjacent to the boundary of DZ is extracted from the created reverse image. Since this area is a hole, the ArM is corrected by filling this area with a "truth".

By taking into consideration the hole-filling area, useful geometric information on an object can be obtained for recognition or removal. However, nevertheless, a simple connected-object area is still required to obtain a useful feature (in particular, skeleton information in the object area).

As Step 206, it is determined whether an effective area could be extracted in Step 204, and if the effective area could be extracted, then the flow moves to Step 212, otherwise moves to Step 206.

As Step 207, segmentation based on brightness (luminance) is performed. For example, the value of Y of the YUV format or V of HUV is discretized, and all the pixels within DZ are sorted into groups of these discrete values. The sorted pixels are converted to those of a connected-area by spatial filtering.

As Step 208, segmentation based on color is performed, as in Step 205.

As Step 209, DZ is segmented into blocks of several pixels in square, and a texture value for each block is calculated, and then areas are formed by grouping the blocks using the texture value.

As Step 210, from a combination of segmentations of Steps 205 to 207, a plurality of effective area candidates are created based on a predetermined rule.

As Step 211, from a plurality of effective area candidates, one effective area is extracted based on a predetermined scale (e.g., area size).

As Step 212, shadow detection and segmentation, and shadow clipping are performed using, for example, the same skeleton processing as that of Embodiment 3.

As Step 213, the corrected object mask is applied to the current image to obtain an image matrix of only the actual object.

Embodiment 5

In an intrusion alarm video-processing device of Embodiment 5, the setup process of Step 104 of Embodiment 1 is improved.

(1) Equipment Configuration of this Embodiment

The configuration of an image processing device is shown in FIG. 9. This monitor device comprises an imaging unit 501, a video input unit 502, an image processor 503, a program memory 504, a work memory 505, an external I/F circuit 506, a video output circuit 507, a data bus 508, an indicator unit 509, and a display unit 510.

(2) Method for Specifying the Monitoring Conditions According to this Embodiment Examples of the monitoring conditions in this embodiment are shown in FIG. 7, FIG. 8. FIG. 7 is a script for monitoring the violation in the running speed and running direction of a vehicle, wherein if the vehicle runs at a speed no more than a predetermined speed and in a predetermined direction, the vehicle is permitted (i.e., the vehicle is neither an object to be alarmed nor an object to be monitored), otherwise the vehicle is prohibited (i.e., the vehicle is an object to be alarmed and monitored). FIG. 8 shows an intermediate script with which the monitoring conditions specified in a script format is subjected to lexical analysis in the image processor 503. In the intermediate script, ": =" is an operator denoting the definition, the left side (left side value) of ": =" denotes the target definition, and the right side (right side value) of ": =" denotes the conditions of the definition. Moreover, "=" is an operator denoting a comparison, the left side value of "=" denotes information on an object, and the right side value of "=" denotes a condition value which a user sets.

(Examples of a list of operators and a list of information on an object, and an example of a conversion procedure from the script to the intermediate script are to be supplemented)

(3) Generation of a Decision Table, and Judgment Using the Decision Table

FIG. 10 shows an example of a decision table. In this embodiment, since the judgment condition comprises a combination of a plurality of conditions, whether a detected object meets the monitoring conditions is determined using the decision table as shown in FIG. 10. Here, for simplicity of description, a case is shown, in which a decision table is created using two pieces of information of the width and the height of a detected object, whereby whether or not the detected object (as an example, an object with 3 m in width and 1.5 m in height) meets a condition 401 can be judged, in other words, whether the detected object can be judged as a [CAR]. First, in FIG. 8, since the conditions with regard to the height of the condition 401 are [WIDTH]=[no less than 2 m] and [WIDTH]=[less than 5 m], the [WIDTH] axis of the decision table, i.e., the horizontal axis is equally divided into five, which are then labeled with [less than 2 m], [2 m], [less than 5 m], [5 m], and [over 5 m], respectively. Here, the reason why there are five labels is that the conditions of [WIDTH] consist of two condition values of [no less than 2 m] and [less than 5 m] and thus boundary portions for discriminating "no less than" and "less than" from others need to be included. Moreover, if one condition value [WIDTH]=[no less than 2 m] is good enough, three subdivisions are provided. Accordingly, the maximum number of subdivisions is the number of twice the number of condition values plus 1. Next, a portion meeting this condition is filled with 1 (e.g., reference number 603), and a portion not meeting this condition is filled with −1 (e.g., reference number 602). If this is also performed to the [HEIGHT] axis, the decision table 601 shown in FIG. 10 is obtained. Next, since the detected object is 3 m in width, and 1.5 m in height, a portion indicated by reference number 603 is filled with 1 according to this decision table and it can be judged that the detected object meets the condition. Even if the number of conditions increases, the number of axes of this decision table and the number of subdivisions of each axis just need to be changed, and practically, data size to such extent that can be stored in a work memory can be handled. Moreover, in this method, whether to meet a condition or not is expressed using values, such as −1 and 1, however, a condition under which decision is not made (Don't care) may be expressed using other value (e.g., 0 or the like).

According to this embodiment, the monitoring conditions can be specified with a readable simple sentence (script), and furthermore, a plurality of conditions are configured so as to be logically judged, thereby allowing complicated conditions to be specified as compared with the related arts, and further allowing a simple and correct specification to be made.

(If special monitoring conditions are configured in advance so as to be downloaded via a network, services flexibly corresponding to various monitoring environments can be realized, thereby also allowing a business model to be constructed.)

Embodiment 6

(1) Equipment Configuration of this Embodiment

The equipment configuration and basic operation of Embodiment 6 are the same as those of Embodiment 5.

(2) Setting of a Monitor Area in this Embodiment

Figure 12:
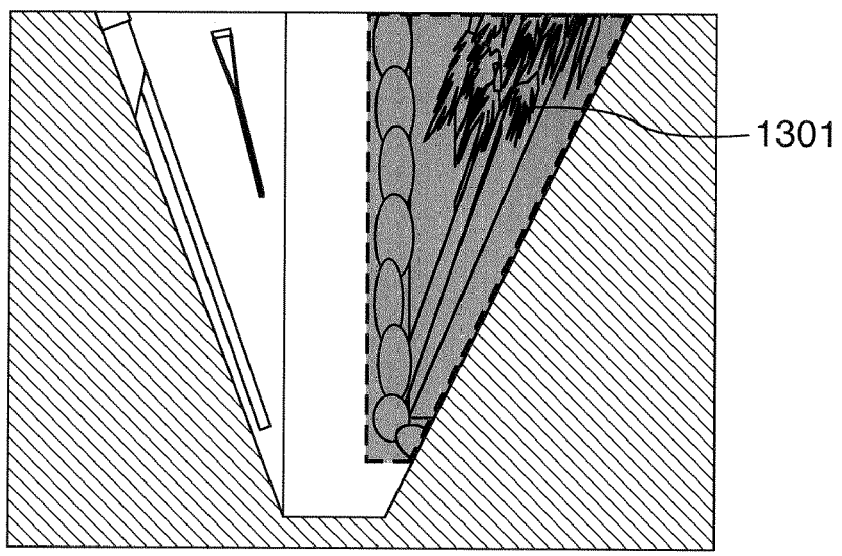
FIG. 12 an example of setting a monitor area in the scene coordinate system (Embodiment 6).

In a monitor area 1301, on the scene coordinate system (the second coordinate system parallel to the ground and is similar to a map), information on a map of an area desired to be monitored is indicated using the indicator unit (FIG. 12). The height information of the area desired to be monitored is provided using a numerical value or the like. Since the height information corresponds to the z axis coordinate of the scene coordinate system (when the height of the xy plane is 0), the height information can be provided as an actual value (2 m, 3 feet, or the like) without relying on the apparent height.

Figure 11:
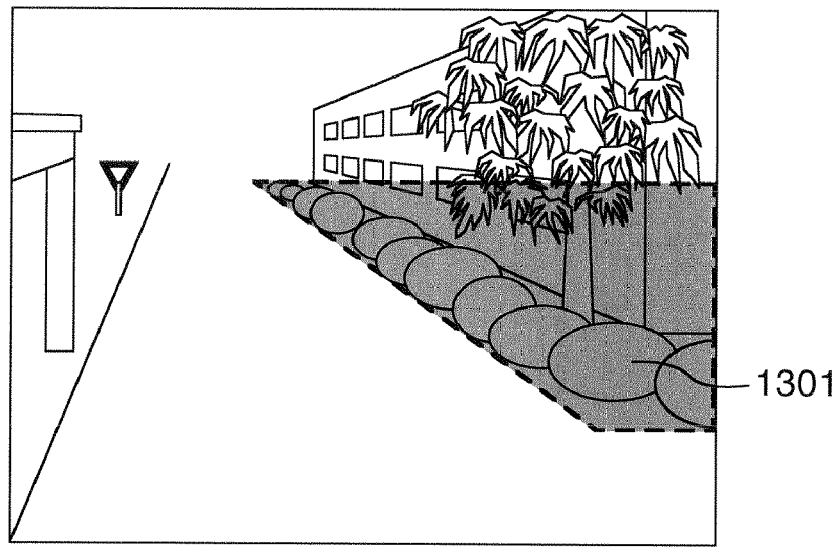
FIG. 11 is an example of setting a monitor area in the camera coordinate system (Embodiment 6).

An indication of the monitor area 1301 may be made directly to the camera coordinate system, such as an input image or the like (FIG. 11). The height of the area desired to be monitored may be preset in advance. The monitor area may be indicated using a circle or a line in addition to a polygon, and the processed area can be specified using various patterns, such as a cylindrical shape, a spherical shape, a perpendicular plane.

(3) Method of Calculating the Distance Between a Camera and a Point on a Monitor Area, in this Embodiment A position (x', y') in the camera coordinate system is converted to a position (x, y) in the scene coordinate system.

Since the scene coordinate system is similar to a map, the distance between a camera and a point on the monitor area is $\sqrt{x^2+y^2}$ when the point of origin 0 of the scene coordinate system is the position of the camera.

(4) Method of Calculating an Apparent Height of a Target Object to be Monitored at the Above-Described Point The camera coordinate on the upper side of the target object is denoted as (x'_head, y'_head) and the camera coordinate on the lower side of the target object is denoted as (x'_legs, y'_legs).

First, the following coordinates are calculated in accordance with the conversion equation to the scene coordinates using camera installation conditions.

Scene coordinate of the upper side of the target object (x_head, y_head)

Angle of depression for imaging the upper side θy_head

Scene coordinate of the lower side of the target object (x_legs, y_legs)

Angle of depression for imaging the lower side θy_legs

Rotation angle θx=θx_head=θx_legs

Figure 14:
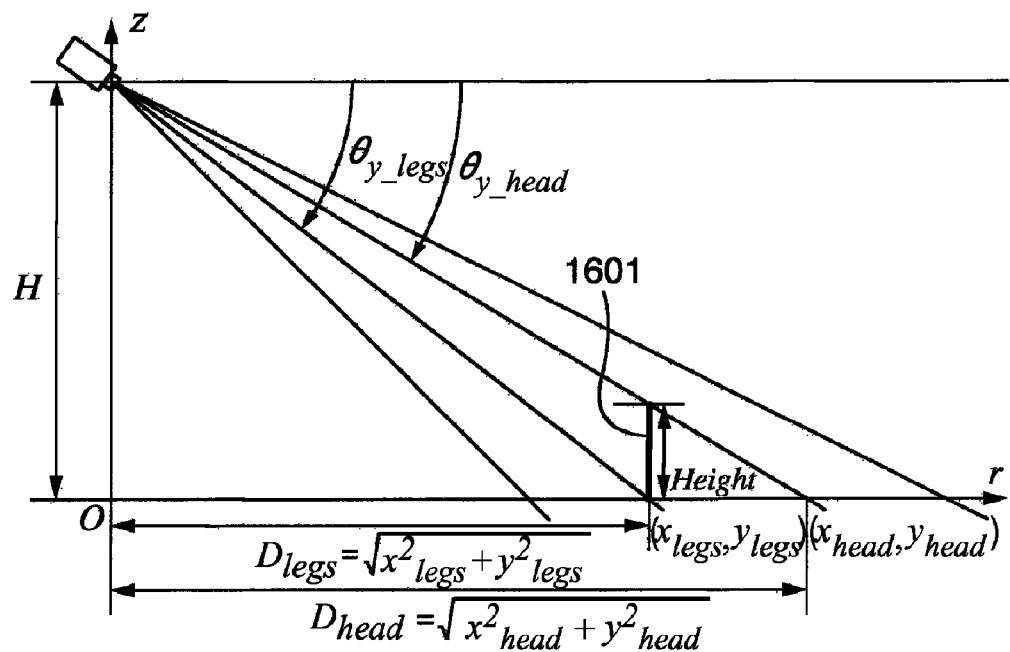
FIG. 14 is an example of imaging an target object to be monitored (Embodiment 6).

Distance between the camera and the upper side of the target object D_legs=$\sqrt{x_{leg}^2+y_{legs}^2}$ Distance between the camera and the lower side of the target object on the scene coordinates D_head=$\sqrt{x_{head}^2+y_{head}^2}$ FIG. 14 shows an example of imaging a target object to be monitored 1601.

According to FIG. 14, the height of a target object (Height) is geometrically calculated by Equation (1-1) below.

$$\text{Height}=(D\_head-D\_legs)/\tan(90°-\theta y\_head) \qquad (1-1)$$

(5) Method of Calculating an Apparent Height by Converting to the Scene Coordinate System

[Apparent height] is calculated (i.e., back calculation of the above (4)) to see which position (x_head, y_head) on the scene coordinates the information of the height (Height) at a point (x_legs, y_legs) on the monitor area appears.

θy_head can be expressed as follows using the installation height H of the imaging unit.

$$\tan(\theta y\_head) = (H - Height)/D\_legs$$

$$[\tan(90 - \theta y\_head) = D\_legs/(H - Height)] \quad (1\text{-}2)$$

Equation (1-1) is transformed and then Equation (1-2) is substituted.

$$D\_head = (Height - D\_legs)/(H - Height) + D\_legs$$

Accordingly, the coordinate (x_head, y_head) of the upper side of the monitor area can be calculated as follows.

$$x\_head = D\_head \cdot \cos(\theta x)$$

$$y\_head = -D\_head \cdot \sin(\theta x)$$

Moreover, the camera coordinate (x'_head, y'_head) can be also calculated in accordance with the coordinate conversion, and the apparent height on the camera coordinate also can be expressed easily.

(6) Method of Generating a Processed Area from a Monitor Area Based on the Apparent Height.

Figure 13:
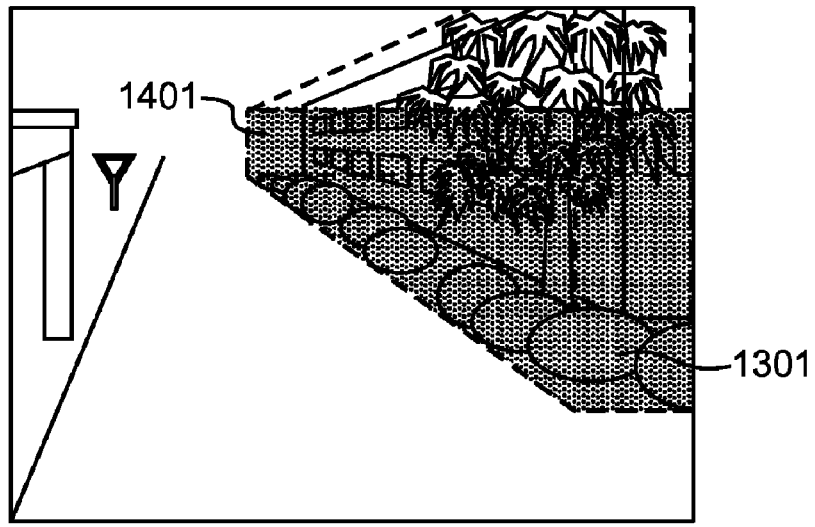
FIG. 13 is an example of generating a processed area taking into consideration the height of a monitor area (Embodiment 6).

The respective apparent heights are calculated from each coordinate of the monitor area 1301 indicated in (2) and the height information of the monitor area. By setting each coordinate, which the apparent height has, and each coordinate, which an indicated monitor area has, to a processed area (FIG. 13), a three-dimensional processed area 1401 can be created taking into consideration the height of the monitor area 1301.

In this embodiment, by setting a monitor area (on a map), a three-dimensional processed area taking into consideration the height of the monitor area can be automatically set up, and therefore, simple area setting without relying on the apparent size can be realized. Moreover, since the area setting by actually measuring the height of an object reflected in an input image is not required, the complexity of setting can be reduced.

Moreover, a monitor area can be set up in the scene coordinate system, and a coordinate on a map can be used, as it is, in setting an area. Furthermore, efficient area setting and intruder monitoring in combination with the previous applications, such as sharing of monitor areas between multiple monitoring devices, are possible.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An object detection method for detecting an object in a video image, comprising the steps of:
    calculating a time-domain average value of each pixel in the image;
    calculating a variance or standard deviation of each pixel in the image using a time-domain filter with a time constant that is variable for each pixel;
    calculating a time-domain maximum value of the variance or standard deviation of each pixel in the image;
    binarizing a current image with a threshold value based on a value obtained by multiplying the maximum value with a predetermined coefficient, for each pixel in the image;
    labeling the binarized image and treating the thus found plurality of connected areas as pre-detection zones;
    controlling the variable time-constant depending on whether the pixel is classified into a background or an object, for each pixel in the image;
    calculating geometric attributes in real space of the plurality of pre-detection zones, and screening the pre-detection zones based on the geometric attributes;
    carrying out spatial filtering including at least one of skeleton analysis processing, object mask processing, morphology operations, and section analysis processings to the binarized image or an image derived from the binarization;
    recording a pre-detection zone, which has been subjected to the spatial filtering step or the screening step, as a tracking zone, and updating the recorded tracking zone in accordance with the degree of coincidence with a stored past tracking zone or tracking a temporal positional-change of a tracking zone of interest by extracting a line component in time and space;
    grouping neighboring tracking zones into a cluster based on a predetermined rule wherein the cluster is created as a rectangular area that contains the neighboring tracking zones and maximum allowable interval between tracking zones integrated into a cluster is defined by a clustering factor; and
    determining the cluster based on a size of the cluster or a plurality of conditions specifying at least one of a variation in a relative position with a predetermined monitor area and a variation in a relative position with other cluster,
    wherein the processing is performed by a computer device comprising a processor.

2. The object detection method according to claim 1, wherein the determination step uses the predetermined monitor area, wherein the predetermined monitor area is defined by either a polygonal column or cylinder perpendicular to a ground, or a plane area using a coordinate system having two orthogonal axes parallel to the ground.

3. The object detection method according to claim 1, wherein the skeleton analysis processing comprises the steps of: acquiring shape information on the pre-detection zone by carrying out thinning process or skeleton processing to the binarized image; extracting main axes from the shape information; and extracting axes of an object by removing axes of a shade from the extracted axes.

4. The object detection method according to claim 1, further comprising the steps of:
    inputting the plurality of conditions described in a script format, as a monitor condition script capable of specifying priorities for the respective conditions and specifying disable or enable of the detection; and
    analyzing a logic of the monitor condition script and generating a decision table, wherein
    the determination step determines whether or not the information on the object matches a monitor condition in accordance with the priorities assigned to the conditions.

5. An intrusion alarm apparatus for detecting an object in a video image, comprising:
    a memory for storing data including image data of images;
    an image processor for processing image data in said memory, the image processor comprising at least a processor; and
    a display unit for displaying images of image data processed by said image processor;
    wherein the image processor performing said processing of image data in said memory and displaying of image data processed by said image processor on said display unit includes:
    calculating a time-domain average value of each pixel in the image,
    calculating a variance or standard deviation of each pixel in the image using a time-domain filter with a time constant that is variable for each pixel, calculating a time-domain maximum value of the variance or standard deviation of each pixel in the image, binarizing a current image with a threshold value based on a value obtained by multiplying the maximum value with a predetermined coefficient, for each pixel in the image, labeling the binarized image and treating the thus found plurality of connected areas as pre-detection zones, controlling the variable time-constant depending on whether the pixel is classified into a background or an object, for each pixel in the image, calculating geometric attributes in real space of the plurality of pre-detection zones, and screening the pre-detection zones based on the geometric attributes, carrying out spatial filtering including at least one of skeleton analysis processing, object mask processing, morphology operations, and section analysis processings to the binarized image or an image derived from the binarization, recording a pre-detection zone, which has been subjected to the spatial filtering step or the screening step, as a tracking zone, and updating the recorded tracking zone in accordance with the degree of coincidence with a stored past tracking zone or tracking a temporal positional-change of a tracking zone of interest by extracting a line component in time and space, grouping neighboring tracking zones into a cluster based on a predetermined rule wherein the cluster is created as a rectangular area that contains the neighboring tracking zones and maximum allowable interval between tracking zones integrated into a cluster is defined by a clustering factor, and determining the cluster based on a size of the cluster or a plurality of conditions specifying at least one of a variation in a relative position with a predetermined monitor area and a variation in a relative position with other cluster.

6. A non-transitory storage medium having stored a program for detecting an object in a video image, said program when executed causes a processor in a computer to perform the steps of:

calculating a time-domain average value of each pixel in the image;

calculating a variance or standard deviation of each pixel in the image using a time-domain filter with a time constant that is variable for each pixel;

calculating a time-domain maximum value of the variance or standard deviation of each pixel in the image;

binarizing a current image with a threshold value based on a value obtained by multiplying the maximum value with a predetermined coefficient, for each pixel in the image;

labeling the binarized image and treating the thus found plurality of connected areas as pre-detection zones;

controlling the variable time-constant depending on whether the pixel is classified into a background or an object, for each pixel in the image;

calculating geometric attributes in real space of the plurality of pre-detection zones, and screening the pre-detection zones based on the geometric attributes;

carrying out spatial filtering including at least one of skeleton analysis processing, object mask processing, morphology operations, and section analysis processings to the binarized image or an image derived from the binarization;

recording a pre-detection zone, which has been subjected to the spatial filtering step or the screening step, as a tracking zone, and updating the recorded tracking zone in accordance with the degree of coincidence with a stored past tracking zone or tracking a temporal positional-change of a tracking zone of interest by extracting a line component in time and space;

grouping neighboring tracking zones into a cluster based on a predetermined rule wherein the cluster is created as a rectangular area that contains the neighboring tracking zones and maximum allowable interval between tracking zones integrated into a cluster is defined by a clustering factor; and determining the cluster based on a size of the cluster or a plurality of conditions specifying at least one of a variation in a relative position with a predetermined monitor area and a variation in a relative position with other cluster.

\* \* \* \* \*